US012735296B2

(12) United States Patent
Hsu

(10) Patent No.: US 12,735,296 B2
(45) Date of Patent: Sep. 15, 2026

(54) TIME-BASED SYSTEM AND METHOD FOR DETERMINING SUSPENSION MEMBER ELONGATION

(71) Applicant: OTIS ELEVATOR COMPANY, Farmington, CT (US)

(72) Inventor: Arthur Hsu, South Glastonbury, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 489 days.

(21) Appl. No.: 18/411,239

(22) Filed: Jan. 12, 2024

(65) Prior Publication Data

US 2025/0230014 A1 Jul. 17, 2025

(51) Int. Cl.
*B66B 1/34* (2006.01)
*B66B 1/28* (2006.01)

(52) U.S. Cl.
CPC .............. *B66B 1/3492* (2013.01); *B66B 1/28* (2013.01)

(58) Field of Classification Search
CPC ......... B66B 1/3446; B66B 11/00; B66B 1/28; B66B 17/12; B66B 11/04; B66B 1/3492; B66B 5/0037; B66B 5/0018
USPC .......................................................... 187/394
See application file for complete search history.

(56) References Cited

PUBLICATIONS

Sudi et al. (CN 108861923 B) Automatic Elevator Checking System And Method (Year: 2018).*
Komdo et al. (CN 110267895 A), Elevator Device (Year: 2019).*
Hu et al. (CN 207046319 U) A Belt Break Pre-warning Function Of Lifting Device (Year: 2018).*
Suzuki et al. (JP 2006027888 A) Main Rope Diagnostic Device of Elevator (Year: 2006).*
Tomoya Takei (JP H05262474 A) Detecting Device for Elongation of Rope in Elevator (Year: 1993).*
Tsutada (JP 2008037602 A) Chain Abnormality Diagnostic Device (Year: 2008).*

* cited by examiner

*Primary Examiner* — Jorge L Carrasquillo
(74) *Attorney, Agent, or Firm* — Carlson, Gaskey & Olds, P.C.

(57) ABSTRACT

A system and method for determining elongation of suspension members in an elevator system that includes an elevator car that is supported for movement within a hoistway by at least one suspension member and a counterweight that is coupled to the elevator car with the at least one suspension member. A first time is determined when the first interactive element detects a presence of the elevator car. A second time is determined when the second interactive element detects a presence of the counterweight. A speed and a direction of the elevator car are also determined. Elongation of the at least one suspension member is then determined by comparing a time difference between the first time and the second time to an elongation threshold.

13 Claims, 1 Drawing Sheet

TIME-BASED SYSTEM AND METHOD FOR DETERMINING SUSPENSION MEMBER ELONGATION

BACKGROUND

Elevator systems are in widespread use for carrying passengers between various levels in buildings, for example. Some elevator systems are traction-based in which a suspension assembly, sometimes referred to as roping, suspends the elevator car and a counterweight. The suspension assembly also facilitates movement of the elevator car when needed. Traditional suspension assemblies include round steel ropes. Some elevator systems have included other types of suspension members, such as flat belts or other types of ropes that have tension members encased in a compressible polymer jacket. Elongation of suspension members is an indication of life/retained breaking strength. As elongation occurs on a very small scale, it can be challenging to measure repeatedly and accurately.

SUMMARY

An illustrative example elevator system includes: at least one suspension member that supports an elevator car and facilitates movement of the elevator car in a hoistway, wherein the elevator car includes a car interactive element mounted for movement with the elevator car; a counterweight coupled to the elevator car with the at least one suspension member, wherein the counterweight includes a counterweight interactive element mounted for movement with the counterweight; a first interactive element that detects a presence of the elevator car via the car interactive element; a second interactive element that detects a presence of the counterweight via the counterweight interactive element; and a control system configured to:

- determine a first time when first interactive element detects a presence of the elevator car,
- determine a second time when the second interactive element detects a presence of the counterweight, determine a speed and a direction of the elevator car, and
- determine elongation of the at least one suspension member by comparing a time difference between the first time and the second time to an elongation threshold.

In addition to one or more of the features described above, or as an alternative, the first interactive element is positioned at a fixed location in the hoistway.

In addition to one or more of the features described above, or as an alternative, the second interactive element is positioned at a fixed location in the hoistway.

In addition to one or more of the features described above, or as an alternative, wherein:

- one of the first interactive element and the car interactive element comprises a sensing component and the other of the first interactive element and the car interactive element comprises a sensed component; and
- one of the second interactive element and the counterweight interactive element comprises a sensing component and the other of the second interactive element and the counterweight interactive element comprises a sensed component.

In addition to one or more of the features described above, or as an alternative, the first interactive element and the car interactive element comprise a first sensor system, and the second interactive element and the counterweight interactive element comprise a second sensor system.

In addition to one or more of the features described above, or as an alternative, the first sensor system and the second sensor system comprise at least one of an optical sensor system, a Hall Effect sensor system, a RFID sensor system, an ultrasonic sensor system, an electromagnetic sensor, an acoustic sensor, or a range/proximity sensor.

In addition to one or more of the features described above, or as an alternative, the control system is configured to store a plurality of time differences over an operational period of the elevator system.

In addition to one or more of the features described above, or as an alternative, the first time and the second time are determined when the elevator car is empty and moving at a constant speed.

An illustrative example method for an elevator system includes at least one suspension member that supports an elevator car and facilitates movement of the elevator car in a hoistway, and a counterweight that is coupled to the elevator car with the at least one suspension member, and the method comprises: mounting a car interactive element for movement with the elevator car; mounting a counterweight interactive element for movement with the counterweight; mounting a first interactive element at a fixed location in the hoistway that cooperates with the car interactive element to detect a presence of the elevator car; generating a car detection signal when the presence of the elevator car is detected; mounting a second interactive element at a fixed location in the hoistway that cooperates with the counterweight interactive element to detect a presence of the counterweight; generating a counterweight detection signal when the presence of the counterweight is detected; and comparing a time difference between a time when the car detection signal is generated and when the counterweight detection signal is generated to determine elongation of the at least one suspension member.

In addition to one or more of the features described above, or as an alternative, the method includes recording and/or storing each determined time difference over a period of time to provide a history of time differences.

In addition to one or more of the features described above, or as an alternative, the method includes generating the car detection signal and counterweight detection signal only during a predetermined operating condition.

In addition to one or more of the features described above, or as an alternative, the predetermined operating condition comprises one or more of the following: the elevator car is moving at a constant speed; the elevator car is moving at a speed that is less than a predetermined speed threshold; the elevator car is empty.

In addition to one or more of the features described above, or as an alternative, the first interactive element and the car interactive element comprise a first sensor system, and the second interactive element and the counterweight interactive element comprise a second sensor system.

In addition to one or more of the features described above, or as an alternative, the first sensor system and the second sensor system comprise at least one of an optical sensor system, a Hall Effect sensor system, a RFID sensor system, or an ultrasonic sensor system, an electromagnetic sensor, an acoustic sensor, or a range/proximity sensor.

In addition to one or more of the features described above, or as an alternative, the method includes: monitoring a speed and a direction of the elevator car; determining a first time when the first interactive element detects a presence of the elevator car; determining a second time when the second interactive element detects a presence of the counterweight; determining the speed and the direction of the elevator car at the first and second times; and determining elongation of the at least one suspension member by comparing a time difference between the first time and the second time to an elongation threshold.

In addition to one or more of the features described above, or as an alternative, one of the first interactive element and the car interactive element comprises a sensing component and the other of the first interactive element and the car interactive element comprises a sensed component; and one of the second interactive element and the counterweight interactive element comprises a sensing component and the other of the second interactive element and the counterweight interactive element comprises a sensed component.

An illustrative example method includes: An illustrative example method includes: supporting an elevator car in a hoistway with at least one suspension member; coupling a counterweight to the elevator car with the at least one suspension member; mounting a car interactive element for movement with the elevator car; mounting a counterweight interactive element for movement with the counterweight; mounting a first interactive element at a fixed location in the hoistway that cooperates with the car interactive element to detect a presence of the elevator car; mounting a second interactive element at a fixed location in the hoistway that cooperates with the counterweight interactive element to detect a presence of the counterweight; monitoring a speed and direction of the elevator car; receiving a first detection signal from detection of one of the elevator car and counterweight; receiving a second detection signal from detection of the other of the elevator car and counterweight; determining if the speed between the first detection signal and the second detection signal is within a desired speed range; and comparing a time different between the first detection signal and the second detection signal with an elongation threshold if the speed is within the desired speed range.

The various features and advantages of an example embodiment will become apparent to those skilled in the art from the following detailed description. The drawings that accompany the detailed description can be briefly described as follows.

DETAILED DESCRIPTION

Embodiments of this disclosure provide for a system and method of a time-based determination of elongation of suspension members that is simple and cost effective.

Figure 1:
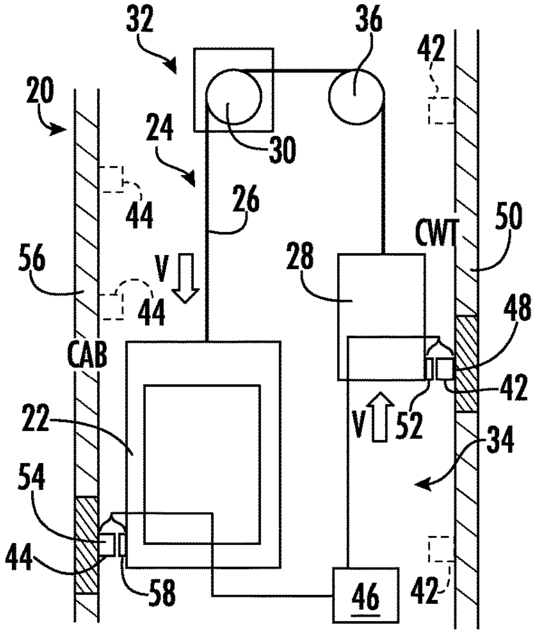
FIG. 1 schematically illustrates selected portions of an elevator system incorporating a system that determines suspension member elongation, wherein the system is in an initial state.
Figure 2:
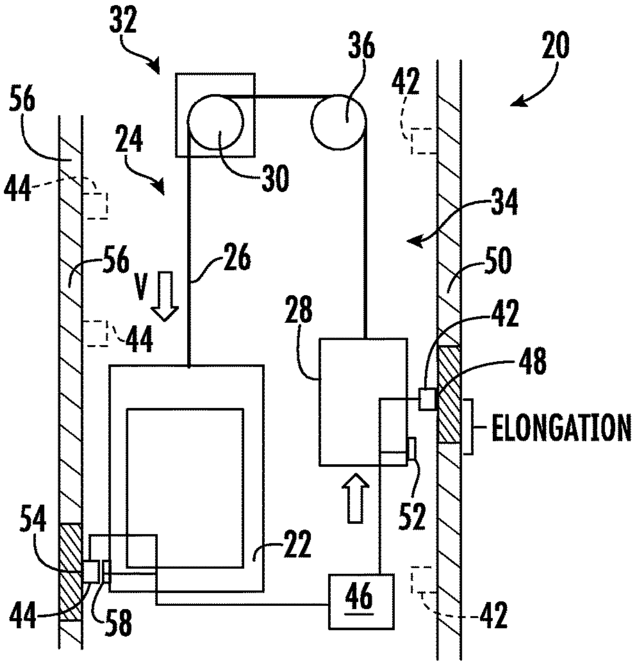
FIG. 2 is similar to FIG. 1 but shows the system in a state of elongation.
Figure 3:
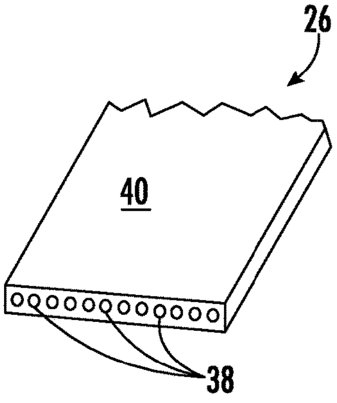
FIG. 3 schematically illustrates a portion of an example suspension member.

FIGS. 1-2 schematically illustrate selected portions of an elevator system 20. An elevator car 22 is supported by a roping arrangement or suspension assembly 24 that includes one or more suspension members 26. The elevator car 22 is coupled to a counterweight 28 by the suspension members 26. In one example, the suspension member 26 comprises coated ropes or coated steel belts where tension members 38 are encased in a compressible polymer jacket 40 as shown in FIG. 3.

A machine sheave 30 is associated with a machine encoder 32. The machine sheave 30 facilitates movement of the elevator car 22 within the hoistway 34. As the suspension members 26 move in response to rotation of the machine sheave 30, the elevator car 22 and counterweight 28 move vertically. The suspension members 26 may move around additional sheaves 36 as the elevator car 22 moves between landings or levels.

In one example, the machine sheave 30 supports the suspension member 26 at a location between the counterweight 28 and the elevator car 22. An elongation determining system includes at least a first interactive element 42 that detects a presence of the counterweight 28, and a second interactive element 44 that detects the presence of the elevator car 22. A control system includes a controller 46 that interacts with the first interactive element 42 and the second interactive element 44 to determine an amount of elongation of the suspension member 26 over time.

In one example, the first interactive element 42 comprises a single discrete sensor positioned at a fixed location 48 in the hoistway 34. In one example, the first interactive element 42 is positioned on a hoistway wall 50 on a counterweight side of the hoistway 34. In another example, a plurality of first interactive elements 42 could be placed along the hoistway wall 50.

In one example, the counterweight 28 includes a counterweight interactive element 52 that interacts with the first interactive element 42 to detect a presence of the counterweight 28. The counterweight interactive element 52 can comprise a magnet, barcode, etc., or can comprise a sensing element. In one example, one of the first interactive element 42 and the counterweight interactive element 52 comprises a transmitting sensor and the other of the first interactive element 42 and the counterweight interactive element 52 comprises a receiving sensor. However, in other examples there are some sensors where both the transmitting and receiving are on the same side, such as for a barcode reader where the transmitter (e.g., a light source) and the receiver (e.g., a photodiode) are on the same side, and the other side includes the barcode which reflects the light source.

In one example, the second interactive element 44 comprises a single discrete sensor that is positioned at a fixed location 54 in the hoistway 34. In one example, the second interactive element 44 is positioned on a hoistway wall 56 on a car side of the hoistway 34. In another example, a plurality of second interactive elements 44 could be placed along the hoistway wall 56.

In one example, the elevator car 22 includes a car interactive element 58 that interacts with the second interactive element 44 to detect a presence of the elevator car 22. The car interactive element 58 can comprise a magnet, barcode, etc., or can comprise a sensing element. In one example, one of the second interactive element 44 and the car interactive element 58 comprises a transmitting sensor and the other of the second interactive element 44 and the car interactive element 58 comprises a receiving sensor.

In one example, the first interactive element 44 and the car interactive element 58 comprise a first sensor system, and the second interactive element 42 and the counterweight interactive element 52 comprise a second sensor system. In one example, the first sensor system and the second sensor system comprise at least one of an optical sensor system, a Hall Effect sensor system, a RFID sensor system, or an ultrasonic sensor system, an electromagnetic sensor, an acoustic sensor, or a range/proximity sensor. In each sensor system, there are two parts where one is attached to the car or counterweight and the other is attached to a fixed point in the elevator hoistway. Further, each of the two parts play different roles in the sensing system. One part comprises a sensor which is communicatively connected to the controller 46 while the other part may be active or may be passive, e.g., a marker like an RFID tag or a barcode. Further, the different roles can be assigned to either side. For example, in one embodiment, a barcode reader is on the hoistway side while the barcode is on the car; while in another embodiment, the barcode reader is on the car and the barcode is on the hoistway side.

In one implementation, the counterweight interactive element 52 comprises a magnet that is mounted for movement with the counterweight 28, and the first interactive element 42 comprises a sensor that detects the presence of the magnet such as a Hall Effect sensor, for example. In one example, the car interactive element 58 comprises a magnet that is mounted for movement with the elevator car 22, and the second interactive element 44 comprises a sensor that detects the presence of the magnet, such as a Hall Effect sensor, for example. In another implementation, the positions of the magnet and the Hall Effect sensors could be switched.

As shown in FIG. 1, in one example, there are two sensed reference points where one reference point comprises the car element 58 attached to the elevator car 22, and the other reference point comprises the counterweight element 52 attached to the counterweight 28. These two elements 52, 58 interact respectively with the first and second interactive elements 42, 44, where the first interactive element 42 is attached to a fixed point 48 in the hoistway 34 and interacts with the counterweight interactive element 52, and the second interactive element 44 is attached to a fixed point 54 in the hoistway 34 and interacts with the car interactive element 58.

In one example, the disclosed system and method for determining elongation is time-based. Time $t_1$ is determined when the car 22 passes the second interactive element 44, and time $t_2$ is determined when the counterweight 28 passes the first interactive element 42. A nominal time difference $T=(t_2-t_1)$ is then determined and stored/recorded by the control system. For all subsequent trials, $t_1$ and $t_2$ are measured in the same way. In one example, the controller 46 is configured to compare the time instant $t_1$ when the car 22, moving at known speed v and direction, passes a reference point, e.g., location 54, with the time instant $t_2$ when the counterweight 28 passes another reference point, e.g., location 48. At the time of initial installation or commissioning, the suspension member 26 is at nominal length, and a time difference $T=(t_2-t_1)$ is stored/recorded. Based on a length L of the suspension member 26 and an allowable elongation factor E (e.g., E=0.001 represents a 0.1% stretch), an allowable limit is reached when $(t_2-t_1) \geq T+(L \times E)/v$.

However, the direction of movement is also important. For example, if the car 22 is moving down, the counterweight would be moving up, and thus $t_1$ (car) and $t_2$ (counterweight) would result in $T=(t_2-t_1)$. T can also be determined in the opposite direction where the car is moving up and the counterweight is moving down, where the definition of the time difference T accounting for the opposite direction is the negative of the previous definition $(T=-(t_2-t_1)=(t_1-t_2))$.

Also, if measuring in the opposite direction with the car moving up, the allowable limit formula becomes: $(t_1-t_2) >= T+(L \times E)/v$. Further, it is important that the speed v be constant during the time between the pair of time measurements $t_1$ and $t_2$ and must match the speed when the original measurements were taken to establish T. Thus, the controller 46 needs to receive the speed as an input and should monitor the speed between the two time measurements. It is also possible to generalize the formulas by using a separate time-averaged speed for both the original measurement and subsequent measurements; however, the simplest and best mode is to always take the pair of time measurements at the same, constant speed.

In one example, the controller 46 is configured to validate trial conditions, e.g., known speed between measurement events $t_1$ and $t_2$, direction, car load, etc. The controller 46 receives the sensor events when the car 22 passes its reference point 54, and receives the sensor events when the counterweight 28 passes its reference point 48, and measures the time difference $(t_2-t_1)$. In other words, when car element 58 passes the second interactive element 44, the controller 46 registers a time $t_1$, and when counterweight element 52 passes the first interactive element 42, the controller registers a time $t_2$ to determine a time difference $(t_2-t_1)$. The controller 46 automatically makes this time difference determination, records the data over time, and automatically and continuously compares the time difference against a threshold (e.g., $T+(L \times E)/v$). Once the controller 46 determines that the threshold is exceeded, an indicator signal can be generated. Optionally, the controller 46 may be configured to output/report an amount of elongation prior to exceeding the threshold.

The controller 46 is part of the control system and includes one or more processors that are used to receive/record input data from the various interactive elements 42, 44, 52, 58 and determine the elongation. In one example, the processor includes one or more computing devices and associated memory. The processor is programmed or otherwise configured to use the different types of information to determine the time differences and associated elongation over time.

For determining/triggering time measurements, the interactive element 42 can be considered to be a first interactive element or a second interactive element, and similarly, the interactive element 44 can be considered to be a first interactive element or a second interactive element. Thus, one of the interactive elements 42, 44 is considered to be the "first interactive element" for triggering the first time $t_1$, while the other of the interactive elements 42, 44 is considered to be the "second interactive element" for triggering the second time $t_2$. In one example, the first time determination can be made when one of the car or counterweight is detected and the second time determination can be made when the other of the car or counterweight is detected. The second time must be measured immediately after the first time is measured. Thus, the times must be taken consecutively of each other.

For determining/triggering time measurements, $t_1$ should always be taken from a particular side (e.g., the car when it is moving down) while conversely $t_2$ should always be taken from the other side (e.g., counterweight). As discussed above, the original calculation for T may be negative depending on how the sensors are installed. For example, in FIG. 1 the second interactive element 44 is shown to be lined up with the car interactive element 58 when the first interactive element 42 is lined up with the counterweight interactive element 52. However, it may be possible due to installation variations that location 48 is lower than depicted. In that case, with the car 22 moving down, the counterweight 28 will be detected first before the car 22 descends lower until the second interactive element 44 and the car interactive element 58 are lined up. In that case, $t_1>t_2$ hence T will be negative.

In one example, it may be best to make the time measurement when the car 22 is known to be empty, is running at constant speed (zero acceleration), and when a hoistway temperature, which can also affect elongation, is controlled. In one example, such conditions would exist during an inspection run. In one example, to improve measurement accuracy of the elongation, the time difference can be increased by temporarily reducing the operating speed of the car during the measurement. In one example, the relative position of the interactive elements 42, 44 is preferred where a magnitude of the time difference is small.

In one example configuration, an elevator system includes a car interactive element 58 mounted for movement with the elevator car 22, a counterweight interactive element 52 mounted for movement with the counterweight 28, a first interactive element 44 that detects a presence of the elevator car 22 via the car interactive element 58, and a second interactive element 42 that detects a presence of the counterweight 28 via the counterweight interactive element 52.

In one example, the control system is configured to determine the time difference each time the car detection signal and counterweight detection signal are generated to compile and store a plurality of time differences over an operational period of time for the elevator system, e.g., generate a history of time differences. Additionally, in one example, a plurality of time differences can be averaged together to determine elongation.

In one example, the first time $t_1$ and the second time $t_2$ are determined when the elevator car 22 is empty and moving at a constant speed. In one example, to improve measurement accuracy, the speed is at a speed below the contract speed, e.g., the maximum running speed of the elevator car. In one example, the times are determined when the car is empty and moving at inspection speed, which is the speed that the car typically runs when a mechanic is working in the hoistway.

Figure 4:
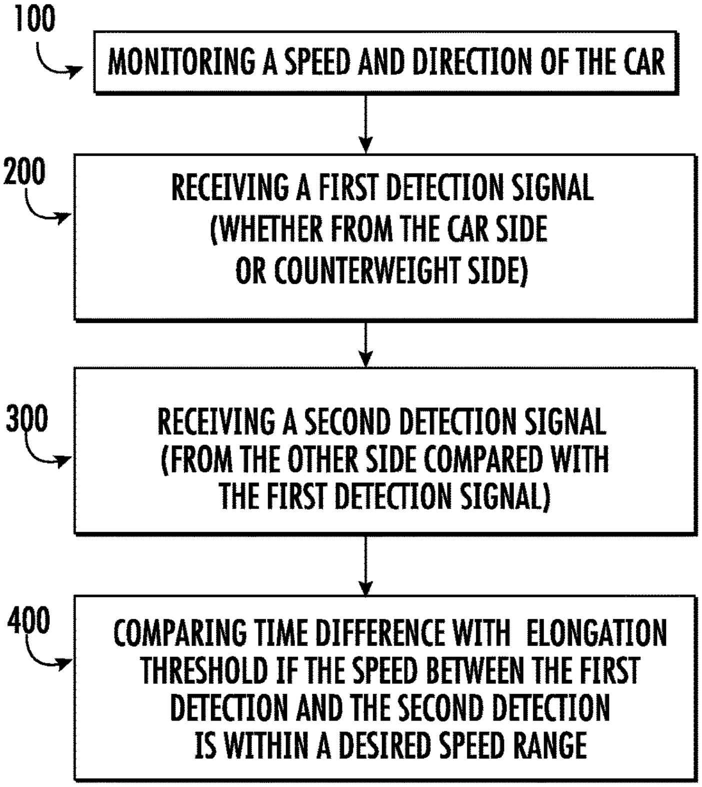
FIG. 4 is a flowchart diagram describing a method of determining elongation of suspension members in an elevator system.

The subject disclosure also provides for a method to automatically detect the elongation of suspension members 26. In one example, as shown in FIG. 4, the method includes a step of monitoring a speed and direction of the car as indicated at 100. Next, the method includes the steps of receiving a first detection signal (whether from the car side or counterweight side) as indicated at 200, and receiving a second detection signal (from the other side compared with the first detection signal) as indicated at 300. Finally, at step 400, if the speed between the first detection and the second detection is within the desired speed range (e.g., are within a tolerance of the desired constant speed), then compare $(t_2-t_1)$ with the elongation threshold where $t_1$ is the time of the car detection signal when the car is moving downwards and where $t_2$ is the time of the counterweight detection signal.

The method may also include any of the following steps either alone or in any combination thereof.

The method may include recording and/or storing each determined time difference over a period of time to provide a history of time differences.

The method may include generating the car detection signal and counterweight detection signal only during a predetermined operating condition.

In one example, the predetermined operating condition comprises one or more of the following: the elevator car is moving at a constant speed; the elevator car is moving at a speed that is less than a predetermined speed threshold such as a speed that is below the contract speed; the elevator car is empty. In one example, the elevator is running at a reduced speed such as inspection speed which is a slower speed (such as 0.1 m/s, for example) that the elevator controller is pre-programmed to operate when a mechanic is manually controlling during a service visit. In one example, the predetermined operating condition is specifically triggered to facilitate the usage of this method. In other words, rather than waiting for the required conditions to occur, the method may include an additional step to trigger the required conditions. In one example, the desired conditions are triggered during a quiet time of the day when the elevator is not being used to carry passengers.

In one example, the method may include wherein the first interactive element and the car interactive element comprise a first sensor system, and the second interactive element and the counterweight interactive element comprise a second sensor system.

In one example, the method may include wherein the first sensor system and the second sensor system comprise at least one of an optical sensor system, a Hall Effect sensor system, a RFID sensor system, or an ultrasonic sensor system.

In one example, a velocity measurement could be taken from existing systems or components. In one example, the elevator motion control system, which monitors the car speed for ride quality and safety reasons, provides the controller 46 with velocity readings on a continuous basis.

In one example, the interactive elements 42, 44 are positioned generally aligned with each other across the hoistway. In another example, the interactive elements 42, 44 are positioned offset of each other across the hoistway.

In one example, the interactive elements 42, 44 are positioned generally away from the terminals of the hoistway where the desired speed can be reached. In one example, the interactive element 42 associated with the counterweight 28 is positioned in a portion of the hoistway that reduces communications distance to the controller 46 (e.g., the upper part of the hoistway if the controller is in the machine room above).

In one example, an existing car side sensing system can be used to trigger a time associated with car detection. In one example, a time can be triggered when a leading or trailing edge of a door vane associated with the car 22 is detected.

In one example, the control system monitors elevator usage over time and stores this information such that a low usage time can be selected for making time measurements.

In one example, the car interactive element 58 is on a car side of a traction sheave and the counterweight interactive element 52 is on a counterweight side of the traction sheave. For example, the interactive elements 52, 58 could be built into the suspension member itself. In one example, the interactive elements 52, 58 could comprise markings, e.g., in a specified ink, on the suspension member, e.g., a rope or belt, or a RFID tag woven into the belt jacket or rope construction.

The subject disclosure provides for a system and method to automatically detect the elongation of suspension members 26 with minimal added cost and without requiring an absolute position referencing system (APRS). The disclosed system and method can be generalized regardless of roping arrangement, e.g., 1:1, 2:1, etc., and direction of car motion. The disclosed system is an inexpensive, automatic system that regularly measures elongation. The system is configured to report the elongation with each trial, rather than only issuing a notification when an elongation threshold is exceeded. The disclosed system has minimal added hardware that includes the provision of two reference points (e.g., magnets on cab and counterweight), and two sensors (e.g., Hall effect sensors) added at fixed locations within the hoistway.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. An elevator system, comprising:
at least one suspension member that supports an elevator car and facilitates movement of the elevator car in a hoistway, wherein the elevator car includes a car interactive element mounted for movement with the elevator car;
a counterweight coupled to the elevator car with the at least one suspension member, wherein the counterweight includes a counterweight interactive element mounted for movement with the counterweight;
a first interactive element that detects a presence of the elevator car via the car interactive element;
a second interactive element that detects a presence of the counterweight via the counterweight interactive element; and
a control system configured to:
determine a first time when the first interactive element detects a presence of the elevator car,
determine a second time when the second interactive element detects a presence of the counterweight,
determine a speed and a direction of the elevator car, and
determine, based on the speed and direction, elongation of the at least one suspension member by comparing a time difference between the first time and the second time to an elongation threshold.

2. The elevator system of claim 1, wherein the first interactive element is positioned at a fixed location in the hoistway, or wherein the second interactive element is positioned at a fixed location in the hoistway.

3. The elevator system of claim 1, wherein:
one of the first interactive element and the car interactive element comprises a sensing component and the other of the first interactive element and the car interactive element comprises a sensed component; and
one of the second interactive element and the counterweight interactive element comprises a sensing component and the other of the second interactive element and the counterweight interactive element comprises a sensed component.

4. The elevator system of claim 1, wherein the first interactive element and the car interactive element comprise a first sensor system, and the second interactive element and the counterweight interactive element comprise a second sensor system.

5. The elevator system of claim 4, wherein the first sensor system and the second sensor system comprise at least one of an optical sensor system, a Hall Effect sensor system, a RFID sensor system, an ultrasonic sensor system, an electromagnetic sensor, an acoustic sensor, or a range/proximity sensor.

6. The elevator system of claim 1, wherein the control system is configured to store a plurality of time differences over an operational period of the elevator system.

7. The elevator system of claim 1, wherein the control system is configured to determine the first time and the second time when the elevator car is empty and moving at a constant speed.

8. A method wherein at least one suspension member supports an elevator car and facilitates movement of the elevator car in a hoistway, and a counterweight is coupled to the elevator car with the at least one suspension member, and the method comprises:
mounting a car interactive element for movement with the elevator car;
mounting a counterweight interactive element for movement with the counterweight;
mounting a first interactive element at a fixed location in the hoistway that cooperates with the car interactive element to detect a presence of the elevator car;
generating a car detection signal when the presence of the elevator car is detected;
mounting a second interactive element at a fixed location in the hoistway that cooperates with the counterweight interactive element to detect a presence of the counterweight;
generating a counterweight detection signal when the presence of the counterweight is detected;
and
comparing a time difference between a time when the car detection signal is generated and when the counterweight detection signal is generated to determine elongation of the at least one suspension member, wherein the method further comprises:
monitoring a speed and a direction of the elevator car;
determining a first time when the first interactive element detects a presence of the elevator car;
determining a second time when the second interactive element detects a presence of the counterweight;
determining the speed and the direction of the elevator car at the first and second times; and
determining, based on the speed and the direction, the elongation of the at least one suspension member by comparing the time difference between the first time and the second time to an elongation threshold.

9. The method of claim 8, including recording and/or storing each determined time difference over a period of time to provide a history of time differences.

10. The method of claim 8, including generating the car detection signal and counterweight detection signal only during a predetermined operating condition.

11. The method of claim 10, wherein the predetermined operating condition comprises one or more of the following:
the elevator car is moving at a constant speed;
the elevator car is moving at a speed that is less than a predetermined speed threshold;
the elevator car is empty.

12. The method of claim 8, wherein the first interactive element and the car interactive element comprise a first sensor system, and the second interactive element and the counterweight interactive element comprise a second sensor system, wherein the first sensor system and the second sensor system comprise at least one of an optical sensor system, a Hall Effect sensor system, a RFID sensor system, or an ultrasonic sensor system, an electromagnetic sensor, an acoustic sensor, or a range/proximity sensor.

13. The method of claim 8 wherein:
one of the first interactive element and the car interactive element comprises a sensing component and the other of the first interactive element and the car interactive element comprises a sensed component; and one of the second interactive element and the counterweight interactive element comprises a sensing component and the other of the second interactive element and the counterweight interactive element comprises a sensed component.

* * * * *